(12) United States Patent
Peters et al.

(10) Patent No.: US 8,922,040 B2
(45) Date of Patent: Dec. 30, 2014

(54) WIND ENERGY PLANT WITH DYNAMIC POWER DISTRIBUTION BETWEEN THE PITCH SYSTEM AND SUPPLEMENTARY ELECTRICAL LOAD

(75) Inventors: Matthias Peters, Elpersbuettel (DE); Martin von Mutius, Ascheffel (DE)

(73) Assignee: Senvion SE, Hamburg (DE)

( * ) Notice: Subject to any disclaimer, the term of this patent is extended or adjusted under 35 U.S.C. 154(b) by 88 days.

(21) Appl. No.: 13/574,572

(22) PCT Filed: Jan. 21, 2011

(86) PCT No.: PCT/EP2011/050831
§ 371 (c)(1),
(2), (4) Date: Oct. 9, 2012

(87) PCT Pub. No.: WO2011/089221
PCT Pub. Date: Jul. 28, 2011

(65) Prior Publication Data
US 2013/0026757 A1 Jan. 31, 2013

(30) Foreign Application Priority Data
Jan. 21, 2010 (DE) .......................... 10 2010 005 286

(51) Int. Cl.
*F03D 9/00* (2006.01)
*F03D 11/00* (2006.01)
*F03D 7/02* (2006.01)

(52) U.S. Cl.
CPC ........... *F03D 11/0025* (2013.01); *Y02E 10/723* (2013.01); *Y02E 10/722* (2013.01); *F03D 7/0224* (2013.01)
USPC ............................................. 290/44; 322/37

(58) Field of Classification Search
USPC .................................. 290/44; 416/162; 322/37
See application file for complete search history.

(56) References Cited

U.S. PATENT DOCUMENTS 7,449,794 B2 * 11/2008 Guey et al. ...................... 290/44
8,154,141 B2 *  4/2012 Andresen ......................... 290/44
(Continued)

FOREIGN PATENT DOCUMENTS

DE          10323785      12/2004
DE     10 2007 016 023    10/2008

OTHER PUBLICATIONS

International Preliminary Report on Patentability and Written Opinion dated Aug. 7, 2012, directed towards PCT Application No. PCT/EP2011/050831; 8 pages.

*Primary Examiner* — Michael Zarroli
(74) *Attorney, Agent, or Firm* — Morrison & Foerster LLP

(57) ABSTRACT

A wind energy plant comprising a rotor having blades and a generator driven by said rotor for generating electric energy. The pitch of the blades can be adjusted and a pitch system for adjusting the pitch angle of the blades is provided, which is supplied by a hub power source. An additional electric load is provided on the hub. A pitch power control device is provided which dynamically distributes the power of the hub power source between the pitch system and the additional electric load and further acts on the pitch system such that its power consumption during high-load operation is reduced. Thus, the power consumption of the pitch system during high-load operation can be reduced and additional power provided for operating the additional load. Even large additional loads, such as a blade heater, can be operated in this way, without having to boost the hub power source.

16 Claims, 3 Drawing Sheets

(56) References Cited

U.S. PATENT DOCUMENTS

| | | | |
|---|---|---|---|
| 8,162,611 B2* | 4/2012 | Perkinson et al. ............ 416/162 |
| 8,432,050 B2* | 4/2013 | Rowan et al. .................... 290/44 |
| 2007/0286731 A1* | 12/2007 | Dantlgraber .................. 416/162 |
| 2010/0259045 A1* | 10/2010 | Vilbrrandt ....................... 290/44 |

* cited by examiner

WIND ENERGY PLANT WITH DYNAMIC POWER DISTRIBUTION BETWEEN THE PITCH SYSTEM AND SUPPLEMENTARY ELECTRICAL LOAD

REFERENCE TO RELATED APPLICATIONS

This application is a national stage application under 35 USC 371 of International Application No. PCT/EP2011/050831, filed Jan. 21, 2011, which claims the priority of German Application No. 10 2010 005 286.8, filed Jan. 21, 2010, the entire contents of which are incorporated herein by reference.

FIELD OF THE INVENTION

The invention relates to a wind energy installation having a rotor for driving a generator, wherein the rotor has blades which are both adjustable in terms of pitch and heatable by blade heating.

BACKGROUND OF THE INVENTION

Wind energy installations are suitable as local generators of electrical energy, particularly also for use in thinly populated areas with favorable wind conditions. Many of these thinly populated areas are in zones with an adverse climate. These also include areas with a cold climate, in particular. In order to toughen up wind energy installations for operation under "cold climate" conditions, blade heating is usually necessary for the rotor blades. This is because it has been found that, without such heating, ice forms or collects on the rotor blades during operation, said ice having disadvantageous effects in multiple respects. Firstly, it alters the aerodynamic profile of the rotor blades, which usually results in significant impairment precisely when the rotor blades have a very advanced aerodynamic design. Furthermore, the formation of ice increases the weight of the rotor blade, which increases the forces to be absorbed by the suspension of the rotor blades; this applies particularly during operation at relatively high speeds and correspondingly growing centrifugal forces or when there are imbalances in the hub as a whole which are caused by different ice formation on the respective rotor blades. Finally, there is also a not inconsiderable risk to persons and objects in the vicinity of the wind energy installation as a result of ice being cast, i.e. as a result of pieces of ice becoming detached from rotor blades and being flung away. In general, the wind energy installation is shut down when there is ice formation on the rotor blades. In order to avoid these disadvantages, blade heating may be provided. On account of the size of the rotor blades and sometimes harsh climatic conditions, however, a relatively large amount of heating power is required for the blade heating. Providing said heating at the location at which it is needed, namely in the hub of the rotor, requires some additional complexity, resulting in additional cost.

In order to be able to still supply power to a large electrical load, such as a blade heater, without amplifying the power available in the hub, a design has become known in which the wind energy installation is shut down while the rotor blades are being heated (DE 103 23 785 A1). Although this has the disadvantage that no further electrical power is generated by the wind energy installation during the phases in which the rotor blades are being heated, this has the advantage that barely any power needs to be expended for the individual requirements of the wind energy installation during the shutdown, and hence all of the electrical power available in the hub can be used for heating the rotor blades. Usually, heating takes place over a period of up to 15 minutes, and after that the wind energy installation is started up again. Although heating using a stopping device of this type has proven itself in principle, this still has the disadvantage that no electrical energy is generated during the heating time, that is to say that the yield is reduced.

This is made even worse by the fact that restarting afterwards is extremely time consuming, which further reduces the production of energy by the wind energy installation. Above all, however, a serious disadvantage is that the ice formation per se is not prevented and hence a risk to the surroundings cannot be ruled out.

SUMMARY OF THE INVENTION

The invention is therefore based on the object of improving wind energy installations of the type cited at the outset such that large loads, such as a blade heating apparatus, can also be operated on the hub and at the same time complex amplification of the supply of power is avoided.

The solution according to the invention lies in the features as broadly described herein. Advantageous developments are the subject matter of the detailed embodiments described below.

In a wind energy installation comprising a rotor having blades and a generator, which is driven by the latter, for generating electrical energy, wherein the blades are adjustable in terms of pitch and a pitch system for adjusting the pitch angle of the blades is provided which is fed from a hub power source, the invention provides a pitch power controller which dynamically distributes the power provided by the hub power source between the pitch system and the supplementary electrical load and in addition acts on the pitch system such that the power draw by the latter is reduced in the high-load mode.

A few terms which are used will first of all be explained below:

A supplementary electrical load is understood to mean a device which is arranged on the rotor hub and provides additional functionality which is not required for basic operation of the wind energy installation. In particular, this includes large loads which each independently have a power draw which is at least one fifth, preferably half, of the electrical power available in the hub. Examples of such supplementary loads are blade heating devices for the rotor blades, particularly with resistance heating or fan heaters, air-conditioning appliances for dehumidifying the hub, cooling appliances for hot-climate versions, powerful warning and protective devices, such as high-intensity hazard lighting for the rotor blades, or particularly complex measured-value capture systems, such as LIDAR or phased-array radar systems for wind or turbulence recognition and determination.

A high-load mode is understood to mean that the wind energy installation is set up such that the supplementary electrical load is supplied with power as a matter of priority. The difference over the normal mode is thus that in the normal mode the priority is given to speed regulation for the wind energy installation, which allows optimum energy yield, and the supplementary electrical load is not operated or is operated only to a small extent.

Dynamically distributed is understood to mean that the power transmitted from the pitch power controller to the pitch system or the supplementary electrical load is variable during operation. In particular, dynamically distributed may also mean that the pitch power controller regulates the power requirement of the supplementary electrical load. Dynamic distribution can therefore also be effected by switching on or switching off or by setting the operating point of the electrical loads.

A hub power source is understood to mean a limited-capacity source for electrical energy which provides electrical power in the rotor assembly. Usually, this will be a power-limiting transmission system of the wind energy installation on which the rotor is arranged so as to be able to rotate. By way of example, this transmission system may be a slipring, and in this case the hub power source is limited by the maximum power which can be transmitted by the slipring. Alternatively, the hub power source can also generate the electrical power autonomously, for example using a storage battery and/or a shaft generator.

The invention is based on the idea of splitting the electrical power provided by the hub power source in the rotor differently in the high-load mode than in the normal mode, namely such that the electrical power drawn by the pitch system is reduced and hence kept within limits which are such that a large portion of the electrical power can be provided for operating the supplementary electrical load. The supplementary electrical load can thus be operated at full power without restrictions. In the case of a blade heater, this means the full heating effect, as has conventionally been able to be achieved only when the wind energy installation has been shut down. In essence, the invention thus provides for dynamically modified power branching, with the power draw by the pitch system being reduced in the high-load mode and hence additional power being provided for operating the supplementary electrical load. Amplification of the hub power source or substantial operating restrictions as in the prior art can thus be avoided. By virtue of the invention, the conventional hub power source which is already present is thus sufficient despite the substantial power requirement for the supplementary electrical load. No additional complexity for amplifying the hub power source is required.

Preferably, the pitch power controller is designed such that the power is limited not rigidly but rather adaptively. To this end, an adaptation device is expediently provided which monitors the pitch power controller and acts on it. The adaptation device may be of various design. Thus, in a first version, the adaptation device may have a current surveillance module. In this case, the power drawn by the pitch system is reduced when the hub power source is loaded to an adjustable maximum degree (for example 90%). This ensures that even with a high level of activity there is always sufficient power available for the supplementary electrical load. Preferably, this comprises a load sensor. This may be produced on the pitch drive, for example as a current sensor (direct measurement), or the power draw can be determined from signals for pitch adjustment rate and acceleration (indirect measurement); if it turns out that the pitch system is under a high load in this case, appropriate action is taken to reduce the power draw. Preferably, the current surveillance module is designed to act on parameters of the pitch system, for example to reduce the gain of a regulator or the maximum permissible pitch adjustment rate in the pitch controller.

In addition, provision may be made for the adaptation device to have a restrictor module. This determines an appropriate restricted operating point for the respective operating point of the wind energy installation, at which restricted operating point the speed and power generated by the generator are reduced. This increases the reserve up until the respective limit values (speed and power) have been reached, so that subsequently there is significantly less pitch activity required by utilizing this reserve.

Expediently, the restrictor module is also designed to reduce the regulatory quality of the pitch control system. This expands tolerance bands and consequently reduces the activity of the pitch system, as a result of which there is ultimately more power available for the supplementary electrical load from the hub power source.

For protection purposes, the adaptation device may also be provided with an interruption module. This is designed to output a suspend signal to the pitch power controller, and hence to disable the high-load mode, when predetermined states of the wind energy installation occur. Preferably, the interruption module is connected to a device for recognizing a voltage dip. Hence, in the event of a system disturbance during a voltage dip, the wind energy installation is able to interrupt the high-load mode, and hence to make all of its resources available for handling the voltage dip. Furthermore, a device for recognizing a system return may be provided. However, in the event of the system returning, startup of the wind energy installation and the alterations in the pitch which are required for this have priority, as a result of which the supplementary electrical load is expediently disconnected for this. The interruption module may have further signal inputs for particular high-load states of the pitch system, particularly for the reaching of maximum current in the pitch system or the implementation of emergency running.

The invention also extends to a method according to the independent claim. For more detailed explanation, reference is made to the description above.

BRIEF DESCRIPTION OF THE DRAWINGS

The invention is explained below using an exemplary embodiment with reference to the appended drawing, in which.

DETAILED DESCRIPTION OF THE INVENTION

Figure 1:
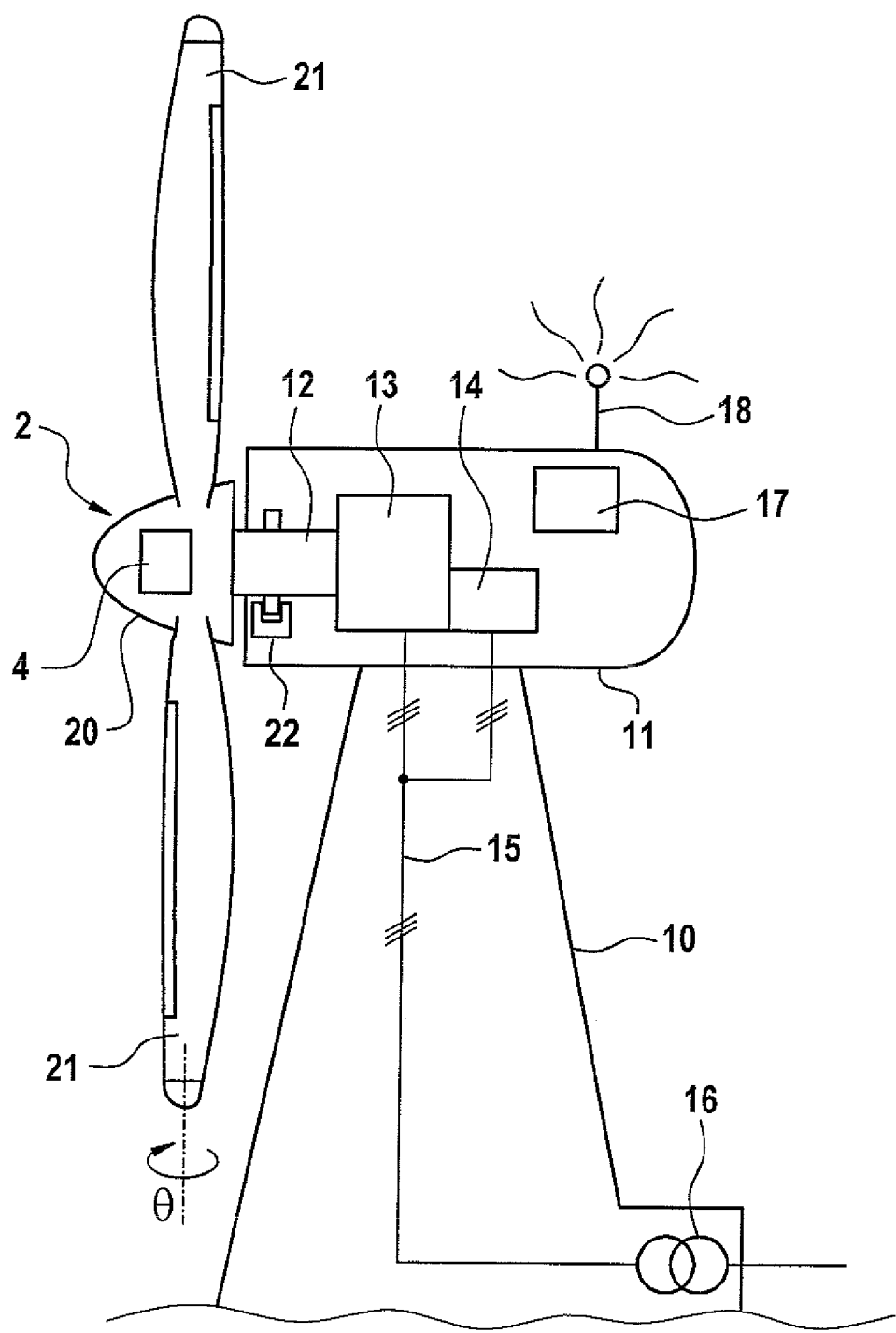
FIG. 1: shows an overview illustration of a wind energy installation based on an exemplary embodiment of the invention.
Figure 2:
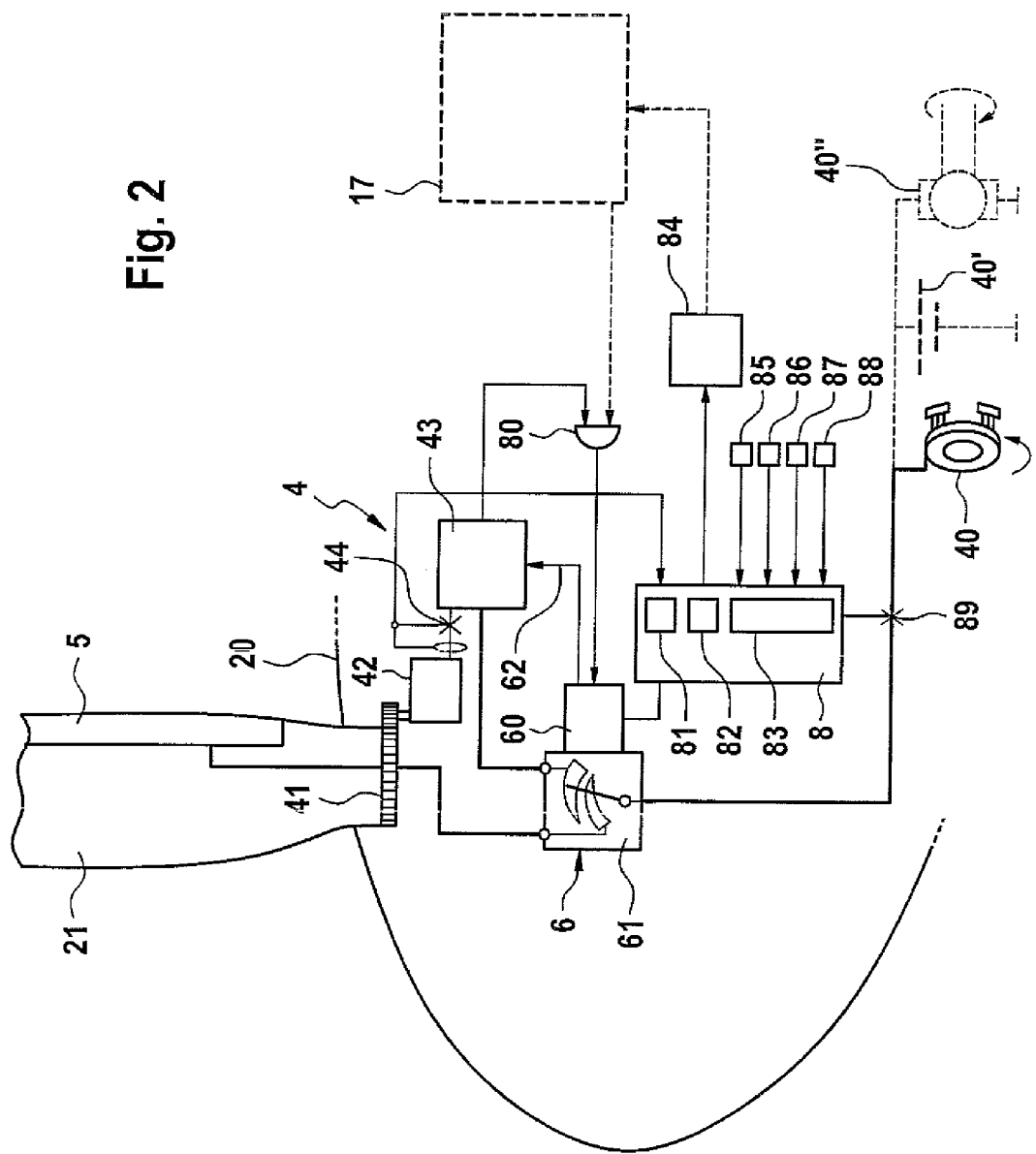
FIG. 2: shows a schematic illustration of the electrical components in the hub of the wind energy installation shown in FIG. 1.

A wind energy installation based on an exemplary embodiment of the invention comprises a gondola 11 arranged on a tower 10 so as to be able to pivot in azimuthal direction. The front of said gondola has a rotor 2 arranged on it so as to be able to rotate, which drives a generator 13 via a generator shaft 12 in order to generate electrical energy. In the exemplary embodiment shown, the generator 13 is in the form of a dual-fed asynchronous generator and is interconnected with a converter 14. The electrical power provided by the generator 13 and the converter 14 is routed via a power cable 15, running in the tower 10, to the base of the tower, where it is connected to a machine transformer 16 for the purpose of outputting the generated electrical energy at a medium voltage level.

In addition, the gondola 11 contains an operating control system 17. This is designed to actuate the individual systems of the wind energy installation, and it is furthermore connected for communication purposes, for example via a radio interface 18, to superordinate control devices, such as a farm master on a wind farm and/or system control centers belonging to a power supply system operator.

The rotor 2 comprises a plurality of rotor blades 21 which are arranged so as to be adjustable in terms of their pitch angle θ on a hub 20 at the end of the generator shaft 12. For the purpose of adjusting the pitch angle θ, a pitch system 4 is provided which comprises an annular gear 41 which is arranged at the blade root of the respective rotor blade 21 and with which a drive sprocket on a server motor 42 arranged firmly on the hub engages. For the purpose of actuating the pitch system 4, a dedicated pitch control system 43 may be provided in the hub. The pitch control system 43 receives guidance signals from the operating control system 17. In addition, the hub 20 contains a hub power source 40 for the pitch system 4. The hub power source 40 may be a slipring, in particular, by means of which electrical power is routed from the gondola 11 into the hub 20. However, it may alternatively or additionally also be a battery 40' or a shaft generator 40" running on the shaft 12. The way in which the pitch system 4 works is such that a target value is prescribed for the pitch angle $θ_s$ by the operating control system 17, and said target value is then adjusted by the pitch control system 43, by operating the drive motor 42 which acts on the annular gear 41 of the rotor blades 21, by rotating the rotor blades 21 until the correct pitch angle θ has been reached.

The rotor blades 21 are also provided with a blade heater 5, which is preferably arranged at least in the region of a nose strip of the rotor blades 21. In the exemplary embodiment shown, the blade heater 5 is in the form of an electric heating element. It is a supplementary electrical load in the hub 20, which supplementary electrical load requires considerable electrical power in the heating mode ("high-load mode"). Energy is supplied by using said hub power source 40, which also supplies power to the pitch system 4. In order to split the power between the pitch system 4 on the one hand the blade heater 5 on the other, the invention provides a pitch power controller 6. This has a control block 60 and a switching block 61 having a power input and two power outputs. The power input has the hub power source 40 connected to it. One of the two outputs has the pitch system 4 connected to it, and the other of the two outputs has the blade heater 5 connected to it. The pitch power controller may be designed for digital changeover, which involves only one of the two systems being supplied with power at a time; in the exemplary embodiment shown, however, it is meant to be a system which can split the power, so that both systems can also be supplied with power simultaneously (albeit not necessarily with power of the same magnitude).

The switching block 61 of the pitch power controller 6 is operated by a control block 60. This is designed to reduce the power drawn by the pitch system 4 in a heating mode. To this end, the control block 60 is connected to the pitch control system 43 by means of a first signal line 62. The effect achieved by this is that the power draw by the pitch system 4 is reduced, and there is thus always sufficient power available for the blade heater 5 for the heating mode.

The pitch power controller 6 has an adaptation device 8 interacting with it. This has a plurality of functional modules, namely a current surveillance module 81, a restrictor module 82 and an interruption module 83. The current surveillance module 81 is designed to monitor the operation of the pitch system 4 by means of a power sensor 44 in the heating mode. If the pitch system is operated such that a critical value for the power draw is reached (for example if, together with the blade heater, 90% of the power of the hub power source 40 were demanded), the hub power source 40 is protected from overload by influencing regulator parameters of the pitch system control system 43. In particular, limitation of the adjustment rate and acceleration for the pitch drive 42 can be prompted by this means.

The restrictor module 82 is designed to operate the wind energy installation at relatively low load as a preventive measure. To this end, on the basis of the normal operating point which is obtained for the respective ambient conditions, particularly in relation to the parameter speed and power, offset values are formed which are deducted from the values for the normal operating point so as thereby to produce modified target values for the parameters at a modified operating point. To this end, an interface 84 is provided which applies the altered data for the operating point to the operating control system 17.

Specifically, this means that, for example on the basis of an operating point with a speed $n_B$ of 20 revs/min, in a partial-load operating situation the target speed for the heating mode a modified operating point with a lowered speed $n_B'$ of 16 revs/min is determined, with the tolerance limits and the action threshold of the pitch system control system 43 not following accordingly, however. There is therefore a substantial buffer, which means that even in the event of incident winds which are suddenly stronger, it is not necessary for the pitch system 4 to be operated, as a result of which the power provided by the hub power source 40 can be used almost to the full extent for the blade heater 5. A similar situation applies to the full-load operating situation. In this case, instead of the speed, the operating point for the power would be lowered accordingly, which results in an appropriate power reserve which in turn reduces the probability of the pitch system 4 being switched on accordingly.

The interruption module 83 has a plurality of signal inputs, which are each designed to detect particular states. Thus, a first signal input has a detector 85 for a voltage dip arranged at it. It should be noted that the detector 85 may be a standalone component or a connection to another device, which is already present anyway and performs voltage dip detection (for example in the operating control system 17). When the occurrence of a voltage dip is detected in this manner, the interruption module 83 acts on the pitch power controller 6 such that the power which the hub power source 40 provides for the blade heater 5 is severely reduced or even switched off completely. The effect achieved by this is that in such an extra ordinary operating situation the pitch system 4 is supplied with power to a sufficient degree to be able to make even large pitch changes at a high pitch adjustment rate and acceleration. Accordingly, a detector 86 for system return, a detector 87 for pitch emergency running and in addition a sensor 89 for recognizing when the maximum flow of current from the hub power source 40 has been reached are provided. In addition, an overspeed detector 88 is connected, so that when a limit speed is reached the suspend signal is output by the interruption module 83. If this furthermore involves a limit value for a speed acceleration being exceeded, a rotor brake 22 is operated.

In addition, an enabling device 18 may be provided which is operated by the pitch system 4. Said enabling device comprises two inputs, one connection for an enabling signal which is output by the pitch system 4 and one connection for a request signal for the supplementary electrical load, which is output by the operating control system 17. An output of the enabling device 80 is connected to the pitch power controller. The enabling device 80 interacts with the pitch power controller 6 such that in the event of predetermined installation states of the supplementary electrical loads occurring the heating system 5 is switched on and changed to the heating mode. This can be brought about directly by the signal applied to the enabling device 80 by the pitch system 4, as a result of which the pitch power controller 6 assigns the power to the heating system 5. Alternatively, a two-stage enabling system may be provided, with the operating control system 17 applying a request signal for the heating mode to the enabling device 80, which request signal is connected to the pitch power controller only if the enabling signal from the pitch control system 4 is also present. Examples of such operating states are, in particular, installation operation of partial load, when the pitch system 4 is in a kind of sleep mode, installation operation for regular wind with only minor pitch activities, or else installation shutdown.

Figure 3:
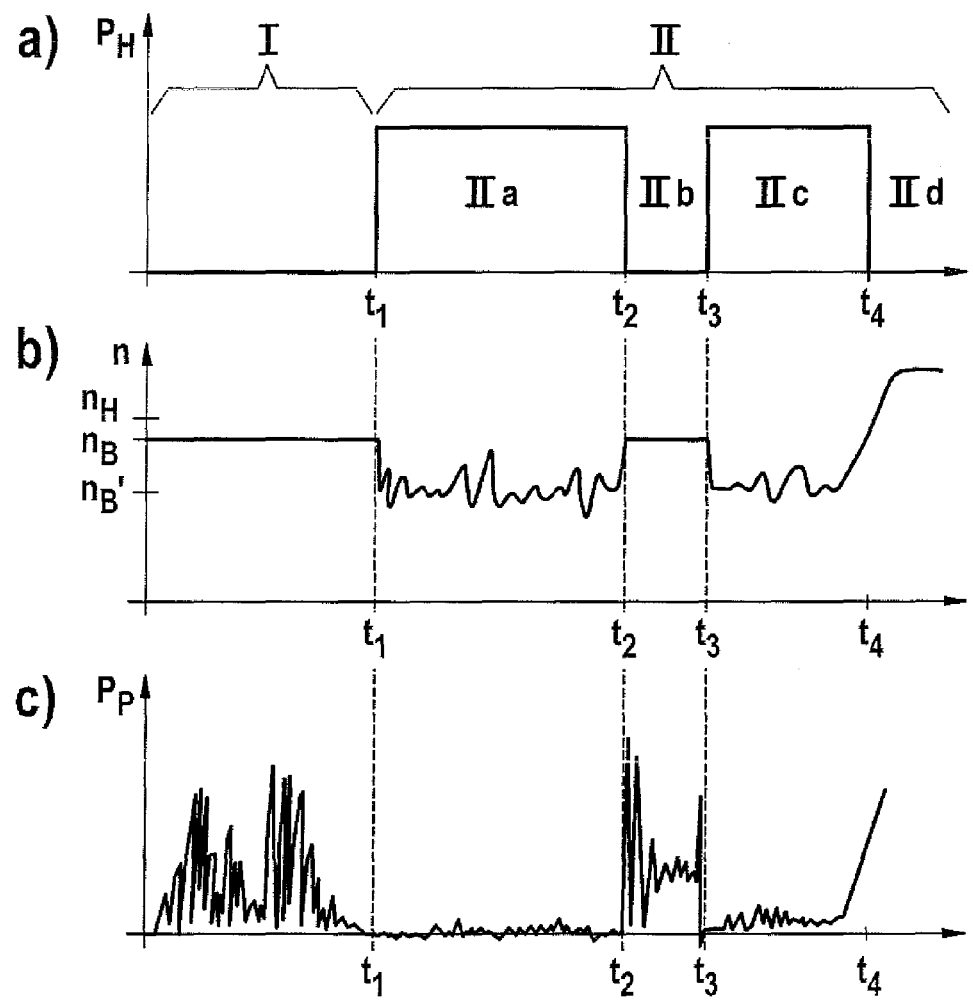
FIG. 3: shows status graphs over time.

An example of a mode of action is shown in FIG. 3. FIG. 3a shows various phases with or without heating mode switched on. In phase I, the heating mode has not yet been switched on, i.e. the wind energy installation is being operated in the normal mode. In the subsequent phase II, the heating mode is activated. FIG. 3b shows the speed values which have been adjusted by the pitch system 4. FIG. 3c shows the activity of the pitch system 4 in the form of operation of the pitch actuating drive 42 for adjusting a pitch angle Θ, with which the speed prescribed by the operating point as shown in FIG. 3b is achieved. It can be seen that compliance with the speed preset in phase I requires brisk activity by the pitch system. At the time $t_1$, the restrictor module 82 determines a modified operating point with a relatively low speed $n_{B'}$. The pitch power controller 6 is activated and assigns a large portion of the power to the blade heater 5. In addition, the current surveillance module 81 is operated. The effect can be seen in FIGS. 3b and c, where the speed discrepancies are greater in phase II than in the preceding operating phase I without heating mode, but these discrepancies are noncritical on account of the preemptive speed lowering and do not exceed the speed $n_B$ of the previously set operating point; the mode is therefore safe. Since greater discrepancies can therefore be permitted, the activity of the pitch system 4 in phase II is reduced. This can easily be seen in FIG. 3c. Since the actuating amplitudes and the rate and also acceleration are reduced, the current draw by the pitch system 4 is correspondingly lower, which means that there is sufficient power available for operation of the blade heater 5.

This state continues until a short occurs in the system in phase IIb. This short is recognized by the detector 85 and is applied as a signal to the interruption module 83. The interruption module then disables the heating mode by actuating the pitch power controller 6 such that the power is provided only for the pitch system 4. The power for the blade heater 5 is therefore removed. Accordingly, the modified operating point and the restriction in respect of the activity of the pitch system are also removed, which means that the wind energy installation can react to this fault situation to the full extent. This phase IIb continues until the system return is recognized by means of the detector 86. The return to the heating mode then occurs in phase IIc, said heating mode being executed in accordance with phase IIa.

It can also be assumed that an overspeed in the rotor 2 occurs (for example on account of an undervoltage in the system to which the transformer 16 is connected). The speed exceeds the upper speed limit $n_H$ at the time t4 with a keenly rising tendency (i.e. large speed acceleration). This is recognized by the overspeed detector 88, and the interruption module 83 operates the pitch power controller 6 such that the power is provided only for the pitch system 4, as a result of which said pitch system can react to the overspeed with the full activity. In order to completely rule out a risk to the safety of the wind energy installation resulting from the high speed acceleration, the rotor brake 22 is additionally operated in order to stabilize the speed (phase IId).

The invention claimed is:

1. A wind energy installation comprising:
   a rotor comprising a hub and blades adjustable in terms of pitch,
   a generator driven by the rotor for generating electrical energy,
   a pitch system for adjusting the pitch angle of the blades,
   a hub power source for feeding the pitch system,
   a supplementary electrical load provided on the hub, and
   a pitch power controller configured to distribute the power during system operation from the hub power source between the pitch system and the supplementary electrical load and to act on the pitch system such that the power draw by the pitch system is reduced in a high-load mode of the supplementary electrical load when the supplementary electrical load is supplied with power.

2. The wind energy installation of claim 1, comprising an adaptation device configured to monitor operating conditions for the pitch system or for the supplementary electrical load and to act on the pitch power controller.

3. The wind energy installation of claim 2, wherein the adaptation device comprises a current surveillance module configured to monitor the flow of current on the pitch system and to modify operating parameters for the pitch system when a limit value is reached.

4. The wind energy installation of claim 3, wherein the current surveillance module comprises a load sensor.

5. The wind energy installation of one of claims 2 to 4, wherein the adaptation device comprises a restrictor module for the pitch control system.

6. The wind energy installation of claim 5, wherein the restrictor module is configured to target values for the pitch control by determining a restrictor operating point with reduced target values for speed or power at an operating point.

7. The wind power installation of claim 5, wherein the restrictor module is configured to reduce the regulatory quality of the pitch control.

8. The wind energy installation of claim 2, wherein the adaptation device comprises an interruption module configured to act on the pitch power controller such that the high-load mode is terminated when predetermined states of the wind energy installation occur.

9. The wind energy installation of claim 1, comprising an enabling device configured to be actuated by the pitch system and to prompt the pitch power controller to change over to the high-load mode.

10. The wind energy installation of claim 9, wherein the operating control system of the wind energy installation is connected to an input of the enabling device by a request signal line.

11. A method for operating a wind energy installation comprising a rotor comprising a hub and blades adjustable in terms of pitch, a generator driven by the rotor for generating electrical energy, a pitch system for adjusting the pitch angle of the blades, a hub power source for feeding the pitch system, and a supplementary electrical load, the method comprising:
   operating the supplementary electrical load in a high-load mode in which the supplementary electrical load is supplied with power as a matter of priority,
   feeding in the high-load mode the supplementary electrical load from the hub power source and
   reducing in the high-load mode the power drawn from the hub power source by the pitch system.

12. The method of claim 11, comprising monitoring operating conditions for the pitch system or for the supplementary electrical load and acting on the pitch power controller.

13. The method of claim 12, comprising monitoring the flow of current on the pitch system and modifying operating parameters for the pitch system when a limit value is reached.

14. The method of claim 13, comprising targeting values for the pitch control by determining a restrictor operating point with reduced target values for speed or power at an operating point.

15. The method of claim 14, comprising reducing the regulatory quality of the pitch control.

16. The method of claim 11, comprising acting on the pitch power controller such that the high-load mode is terminated when predetermined states of the wind energy installation occur.

\* \* \* \* \*